(12) United States Patent
Shimaguchi

(10) Patent No.: US 6,884,200 B2
(45) Date of Patent: Apr. 26, 2005

(54) SHIFT CONTROL METHOD FOR AN AUTOMATIC TRANSMISSION

(75) Inventor: Hiromichi Shimaguchi, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 10/398,000

(22) Filed: Mar. 26, 2003

(65) Prior Publication Data

US 2003/0183032 A1 Oct. 2, 2003

(30) Foreign Application Priority Data

Mar. 27, 2002 (JP) .................................... 2002-088406

(51) Int. Cl.[7] ...................... F16H 59/14; F16H 63/00
(52) U.S. Cl. ...................................... 477/124; 74/366 R
(58) Field of Search ........................ 74/335, 336 R; 477/124; 701/64

(56) References Cited

U.S. PATENT DOCUMENTS

| 6,044,719 A | 4/2000 | Reed, Jr. et al. | |
|---|---|---|---|
| 6,164,149 A | * 12/2000 | Ohmori et al. | 74/335 |
| 6,276,224 B1 | * 8/2001 | Ueda et al. | 74/335 |
| 6,494,110 B2 | 12/2002 | Hatakeyama | |
| 6,514,173 B2 | * 2/2003 | Suzuki | 477/124 |
| 6,578,442 B2 | * 6/2003 | Aoyama et al. | 74/335 |
| 6,591,704 B2 | * 7/2003 | Kamiya et al. | 74/335 |
| 6,691,588 B2 | * 2/2004 | Miyazaki et al. | 74/336 R |

FOREIGN PATENT DOCUMENTS

| JP | 05-248527 | 9/1993 |
|---|---|---|
| JP | 05-96617 U | 12/1993 |
| JP | 06-201027 | 7/1994 |
| JP | 2703169 B2 | 10/1997 |
| JP | 3011567 B2 | 12/1999 |
| JP | 2000-097297 | 4/2000 |
| JP | 2001-227599 | 8/2001 |
| JP | 2001-227600 | 8/2001 |
| JP | 2001-280495 | 10/2001 |
| JP | 2001-289288 | 10/2001 |

* cited by examiner

*Primary Examiner*—Ha Ho
(74) *Attorney, Agent, or Firm*—Flynn, Thiel, Boutell & Tanis, P.C.

(57) ABSTRACT

An automatic transmission in which a plurality of gear trains is shifted by a shift mechanism which has at least two stages, including stronger and weaker operational force stages. Shift operation of the shift mechanism is started with the weaker operation force, and is switched to the stronger operation force when the movement of the shift mechanism is detected. Ratio of rotating speeds of input and output shafts is controlled by a clutch variably controlling the transmitted torque. Shift operation of the shift mechanism is switched to the stronger operation force when the ratio of rotating speeds of input and output shafts is close to the rotating speed of the gear being selected.

3 Claims, 8 Drawing Sheets

DURING 1st SPEED OPERATION (AT THE BEGINNING OF 3rd SPEED CLUTCH TORQUE DISTRIBUTION)

DURING 3rd SPEED CLUTCH TORQUE DISTRIBUTION

AFTER SYNCHRONIZATION WITH AND SHIFTED TO THE 2nd SPEED

AT THE BEGINNING OF 3rd SPEED CLUTCH DISENGAGEMENT

AFTER 3rd SPEED CLUTCH IS DISENGAGED

SHIFT TIMING TOO FAST

SHIFT TIMING TOO SLOW

NEGATIVE TORQUE IS TRANSMITTED

WHEN LOW LOAD SHIFT FORCE IS APPLIED

Legend: ---Tg, ·····Tc, ----Fs, ——F SHIFT, -·-·-S SHIFT

NEUTRAL POSITION
SLEEVE STARTS MOVING WHEN Fs = F SHIFT
ENGAGING POSITION
F SHIFT WHICH CORRESPONDS TO Fs DEPENDENT ON Tg WHICH DOES NOT GIVE SHOCK
WHEN NEUTRAL IS DETECTED, THEN F SHIFT = 0

SHIFT CONTROL METHOD FOR AN AUTOMATIC TRANSMISSION

FIELD OF THE INVENTION

This invention relates to a shift control method for an automatic transmission, and more particularly to a shift control method for an automatic transmission to avoid gear shock and grinding noise of gears resulting from non-synchronized gears and to achieve easier synchronize control.

BACKGROUND OF THE INVENTION

In vehicles, a manual or automatic transmission is equipped to convert the driving force of an internal combustion engine according to a driving state of the vehicle. Such a transmission includes a gear-type transmission and a belt-type transmission, although the gear-type is usually used since it has less loss of transmitted torque. Sometimes a manual transmission is automated to operate in the same manner as the normal manual transmission.

One example of a control method for an automatic transmission is disclosed in patent JP 3011567. In the transmission and the control method disclosed therein, a target speed for a countershaft for shift control is calculated from both the number of gear teeth of a gear being selected, and a rotating speed of an output shaft. Two clutches on opposite sides of the transmission are controlled for engagement and disengagement. The shift operation is executed when the rotating speed of the countershaft is close to the target speed. Thereby, a smooth shift operation is achieved in a short time.

Another example of a control method for an automatic transmission is disclosed in Laid-Open JP No. H05-248527. In the automatic transmission and control method disclosed therein, predetermined lower oil pressure is applied to a chamber in the clutch if a condition for engagement of the clutch is satisfied. The resulting oil pressure is traveled to a position where a piston contacts with a clutch plate. However, it is set so as to not apply pressing force. From this state, the oil pressure in the oil chamber in the clutch is raised at certain timing, so that the clutch is immediately engaged. Thereby, there is a time delay in which the piston at an initial position moves to the position where the pressing force is applied to the clutch plate when the clutch is engaged.

A further example is disclosed in Laid-Open JP No. 2001-227599. The automatic transmission disclosed therein includes input and output shafts, a main clutch to transmit driving force of an engine to the input shaft, and a shift mechanism to shift a plurality of gear trains, with the shift mechanism automatically being controlled at gear shift. The transmission has a plurality of mounting shafts on which each gear defining the gear trains is mounted. An intermediate shaft is disposed at a position other than an extending portion of the mounting shaft. A sub-clutch is disposed on the intermediate shaft and variably controls torque transmitted from the output shaft to the input shaft. The sub-clutch is accommodated in a transmission case without increasing its dimension in an axial direction. In relation to the dimension of the transmission case, a space for storing, and a layout of the transmission, compatibility with the conventional transmission is increased.

In an automatic/manual transmission (hereinafter referred to as an automatic transmission) in which the conventional manual transmission (MT) is automated, the gear shift is operated in the same manner as the normal manual transmission.

More particularly, this shift operation is explained as follows: a start clutch is disconnected at a first operation; a gear is disconnected at a second operation; a shift lever is moved into a position of the gear being selected to actuate a synchronizer at a third operation; the gears are synchronized and engaged at a fourth operation; and the start clutch is engaged at a fifth operation.

At this time during the shift operation with the clutch being disconnected, shift shock does not occur. Also, poor synchronizing engagement does not occur.

Whereas, for the new automatic transmission of this invention wherein the disconnection of the driving force during gear shifting is reduced, the clutch is not required to be disengaged during gear shift, which differs from the shifting operation of the conventional automatic transmission.

For example, when shifting from a first-speed into a second-speed position: at a first operation, a clutch shares (distributes) the torque, which clutch is disposed on a drive force transmitting path between the input and output shafts and is capable of variably controlling the transmitted torque; at a second operation, the first speed gear is disengaged; at a third operation, the clutch synchronizes to the speed corresponding to the second-speed gear; at a fourth operation, the second-speed is engaged after synchronization; and at a fifth operation, the clutch is disengaged.

In these operations, if the clutch, which is disposed on a path between the input and output shafts and is capable of variably controlling the transmitted torque, does not properly share the torque, the torque is still applied to the first speed gear. In this state, the disengagement of the gear results in undesirable gear shock.

In addition, if the precise synchronization is not provided during shifting to the second-speed, the gear shock or the gear grinding noise due to poor synchronization occurs.

SUMMARY OF THE INVENTION

In order to obviate or at least minimize the above inconveniences, this invention provides an improved shift control method for an automatic transmission. More particularly, the shift control method includes an input shaft to which driving force from an engine is input, an output shaft substantially parallel with the input shaft to output the shifted driving force of the engine toward drive wheels, a start clutch to connect or disconnect between the engine and the input shaft, a plurality of gear trains disposed between the input and output shafts so as to provide various gear ratios, a shift mechanism to shift each gear train, a clutch on a drive force transmitting path between the input and output shafts to variably control the transmitted torque, the clutch being configured to transmit the torque during gear shift, and an actuator to shift the gear trains. In one embodiment of the present invention, the operation force of the shift mechanism has at least two stages, including stronger and weaker stages. A sensor is provided to detect the movement of components of the shift mechanism. Shift operation of the shift mechanism is started with the weaker operation force, and is switched to the stronger operation force when the movement of the shift mechanism is detected.

The invention also provides a shift control method for an automatic transmission including an input shaft to which driving force of an engine is input, an output shaft in parallel with the input shaft to output the shifted driving force of the engine toward drive wheels, a start clutch to connect or disconnect between the engine and the input shaft, a plurality of gear trains disposed between the input and output shafts so as to provide selected gear ratios, a shift mechanism to shift each gear train, a clutch on a drive force transmitting path between the input and output shafts to variably control the transmitted torque, the clutch being configured to transmit the torque during gear shift, and an actuator to shift the gear trains. In the present invention, the operation force of the shift mechanism has at least two stages, including stronger and weaker stages. Sensors to detect rotating speeds of the input and output shafts are provided. Shift operation of the shift mechanism is started with the weaker operation force. The ratio of the rotating speeds of the input and output shafts is controlled by the clutch so as to variably control the transmitted torque. Shift operation of the shift mechanism is switched to the stronger operation force when the ratio of rotating speeds of the input and output shafts is close to the rotating speed of the gear being selected.

According to the present invention, the operation force of the shift mechanism has at least two stages, including stronger and weaker stages. The shift operation of the shift mechanism is started with the weaker operation force, and is changed to the stronger operation force after the shift operation of the shift mechanism is detected. The state of the torque of the gear train being selected is detected. Accordingly, the gear shift is easily achieved without shift shock or grinding noise resulting from poor synchronization.

In addition, the operation force of the shift mechanism has at least two stages, including stronger and weaker stages. As stated above, the shift operation of the shift mechanism is started with the weaker operation force. The ratio of rotating speeds of input and output shafts is controlled by the clutch variably controlling the transmitted torque. The shift operation of the shift mechanism is switched to the stronger operation force when the ratio of rotating speeds of input and output shafts is close to the rotating speed of the gear being selected. Accordingly, the shift mechanism is operated with the weaker operation force which imposes less load to the shift mechanism, while achieving easier synchronizing control and reducing shift time.

DETAILED DESCRIPTION OF THE INVENTION

An embodiment of the present invention will now be described in detail with reference to the drawings, wherein FIGS. 1–15 illustrate an embodiment of the present invention.

Figure 2:
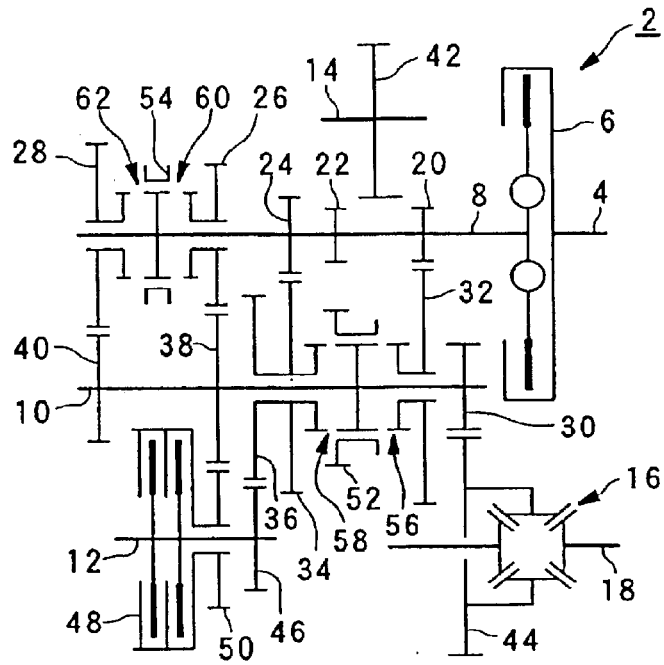
FIG. 2 is a schematic view of an automatic transmission.

In FIG. 2, reference numeral 2 designates an automatic manual transmission for a vehicle in which clutch operation and gear shifting operation of a manual transmission (MT) are automatically controlled by actuators (hereinafter the automatic manual transmission is referred to as an "automatic transmission").

The automatic transmission 2 includes an engine output shaft 4 to input driving force from an engine (not shown), and a main or start clutch 6 connected to the engine output shaft 4 to connect and disconnect the driving force between the engine and the input shaft 8.

A countershaft or an output shaft 10 is disposed substantially parallel with the input shaft 8 and outputs the shifted driving force of the engine toward the vehicle drive wheels (not shown). The countershaft 10, a transmission or intermediate shaft 12, a reverse idler shaft 14, and a drive shaft 18 associated with differential section 16 are disposed longitudinally of the automatic transmission 4 and substantially parallel with the input shaft 8.

The input shaft 8 includes, from the engine side, a first-speed drive gear 20, a reverse drive gear 22, second-speed drive gear 24, a fourth-speed drive gear 26 rotatably mounted on the shaft 8, and a fifth-speed drive gear 28 rotatably mounted on the shaft 8. The gears 20, 22, 24 are fixed to the input shaft 8.

The countershaft 10 includes, from the engine side, a final drive gear 30, a first-speed driven gear 32 in mesh with the first-speed gear 20, a second-speed driven gear 34 in mesh with the second-speed drive gear 24, a third-speed drive gear 36 fixed to the second-speed driven gear 34, a fourth-speed driven gear 38 in mesh with the fourth-speed drive gear 26, and a fifth-speed driven gear 40 in mesh with the fifth-speed drive gear 28. Gears 30, 38 and 40 are fixed to the countershaft 10.

In addition, the reverse idler gear shaft 14 has a reverse idler gear 42 nonrotatably mounted thereon and adapted for meshing with the reverse drive gear 22.

The final drive gear 30 meshes with a final driven gear 44 in the differential section 16.

Also, the transmission shaft 12 includes a third-speed driven gear 46 fixed thereto and in mesh with the third-speed drive gear 36, a secondary or sub-clutch 48 disposed on a drive force transmitting path between the input and output shafts 8, 10 to variably control the transmitted torque, and a third-speed middle gear 50 mounted to the clutch 48 and in mesh with the fourth-speed driven gear 38. In the driving force transmitting path for the third-speed of this automatic transmission, the driving force from the engine is transmitted through the start clutch 6, the input shaft 8, the second-speed drive and driven gears 24 and 34, the third-speed drive and driven gears 36 and 46, the clutch 48, the third-speed middle gear 50, the fourth-speed driven gear 38, the countershaft 10, and the final drive and driven gears 30, 44, to the differential section 16. In this embodiment, the clutch 48, which is disposed on the path between the input and output shafts to variably control the transmitted torque, functions as part of the path for the third-speed, so that it is also referred to as a third-speed clutch.

The countershaft 10 includes, between the first- and second-speed driven gears 32, 34, a 1st/2nd sleeve 52 which is a part of 1st and 2nd synchronizers 56, 58 mentioned later. The input shaft 8 includes, between the fourth- and fifth-speed drive gears 26, 28, a 4th/5th sleeve 54 which is a part of 4th and 5th synchronizers 60, 62 mentioned later.

Between the 1st/2nd sleeve 52 and the first-speed driven gear 32, the countershaft 10 includes the 1st synchronizer 56 defining a shift mechanism. Also between the 1st/2nd sleeve 52 and the second-speed driven gear 34, the countershaft 10 includes the 2nd synchronizer 58 also defining the shift mechanism.

Between the 4th/5th sleeve 54 and the fourth-speed drive gear 26, the input shaft 8 includes the 4th synchronizer 60 defining the shift mechanism. Also between the 4th/5th sleeve 54 and the fifth-speed drive gear 28, the input shaft 8 includes the 5th synchronizer 62 defining the shift mechanism.

The shift sleeves 52 and 54 are nonrotatably but axially slidably engaged around the shafts 10 and 8 respectively.

Figure 3:
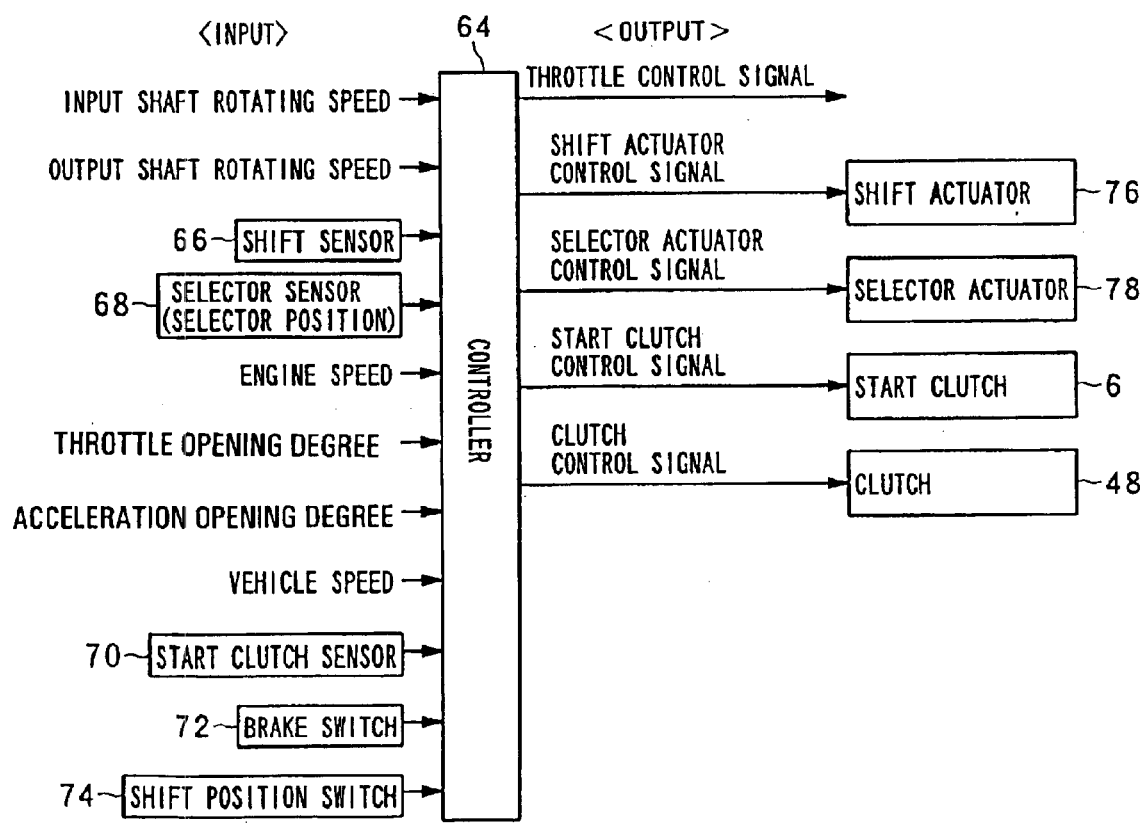
FIG. 3 is a schematic block-diagram of a control for the automatic transmission.
Figure 4:
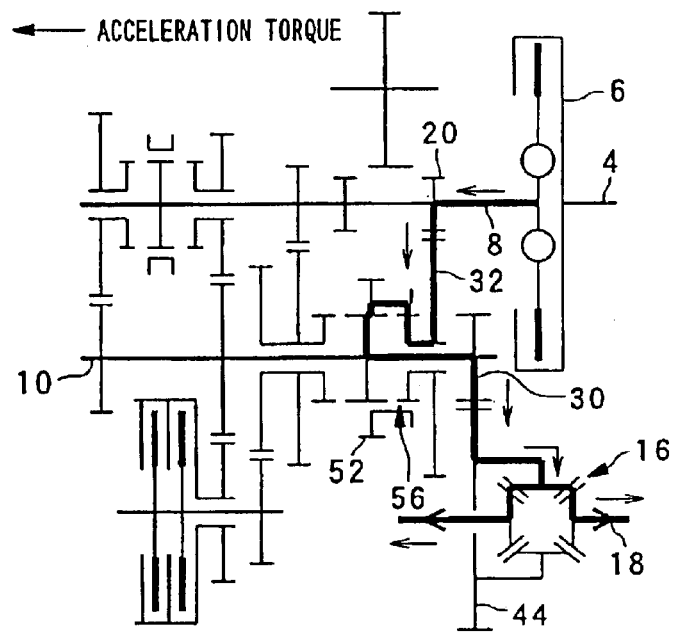
FIG. 4 is a schematic view of the transmission showing acceleration torque during operation in first-speed.

Referring to FIG. 3, a controller 64 to control the automatic transmission 4 is connected at an input side to a shift sensor 66, a selector sensor 68 to detect a selected position, a start clutch sensor 70, a brake switch 72, and a shift position switch 74. The controller 64 receives signals representing input and output shaft rotating speeds, engine speed, throttle opening degree, acceleration opening, and vehicle speed.

In addition, the controller 64 is connected at an output side to a shift actuator 76, a select actuator 78, the start clutch 6, and the clutch 48. The controller 64 outputs a throttle control signal, a shift actuator control signal, a select actuator control signal, a start clutch control signal, and a secondary clutch control signal.

Further, the controller 64 controls the operation force of the shift mechanism so that it has stronger and weaker stages, e.g., two stages, and includes a sensor to detect movements of components in the shift mechanism. The shift mechanism starts the gear shift operation with the weaker operational force during gear shift, and is changed to the stronger operational force after the shift operation of the shift mechanism is detected.

More particularly, the shift mechanism is a synchronizer and, during shifting to the second-speed as an example, is a second-speed synchronizer 58. The weaker operational force is a lower force in which a dog GD of the engaged gear G (FIG. 10) and the 1st/2nd sleeve 52 as a shift sleeve of the 2nd synchronizer 58 are able to disconnect in a lower torque transmitted state, but are unable to disconnect in a higher torque transmitted state.

The sensor to detect the movements of the components of the 2nd synchronizer 58 utilizes signals output from, e.g., the shift sensor 66 and the selector sensor 68.

The gear shift of the 2nd synchronizer 58, which is a condition to change to the stronger operation force, is executed according to the movement of the synchronizer after its balk or delay in movement.

Furthermore, sensors are equipped to detect the rotating speeds of the input and output shafts 8 and 10. The gear shift of the 2nd synchronizer 58 or the shift mechanism is started with the weaker operation force during shift change. The ratio between the rotating speeds of the input and output shafts 8, 10 is controlled by the secondary clutch 48 to variably control the torque transmitted. When the ratio between the rotating speeds of the input and output shafts 8, 10 is close to the ratio of speed of the gear being selected, the gear shift of the 2nd synchronizer 58 is executed with the stronger operation force.

Next, the operation of the present invention will be explained.

Figure 1:
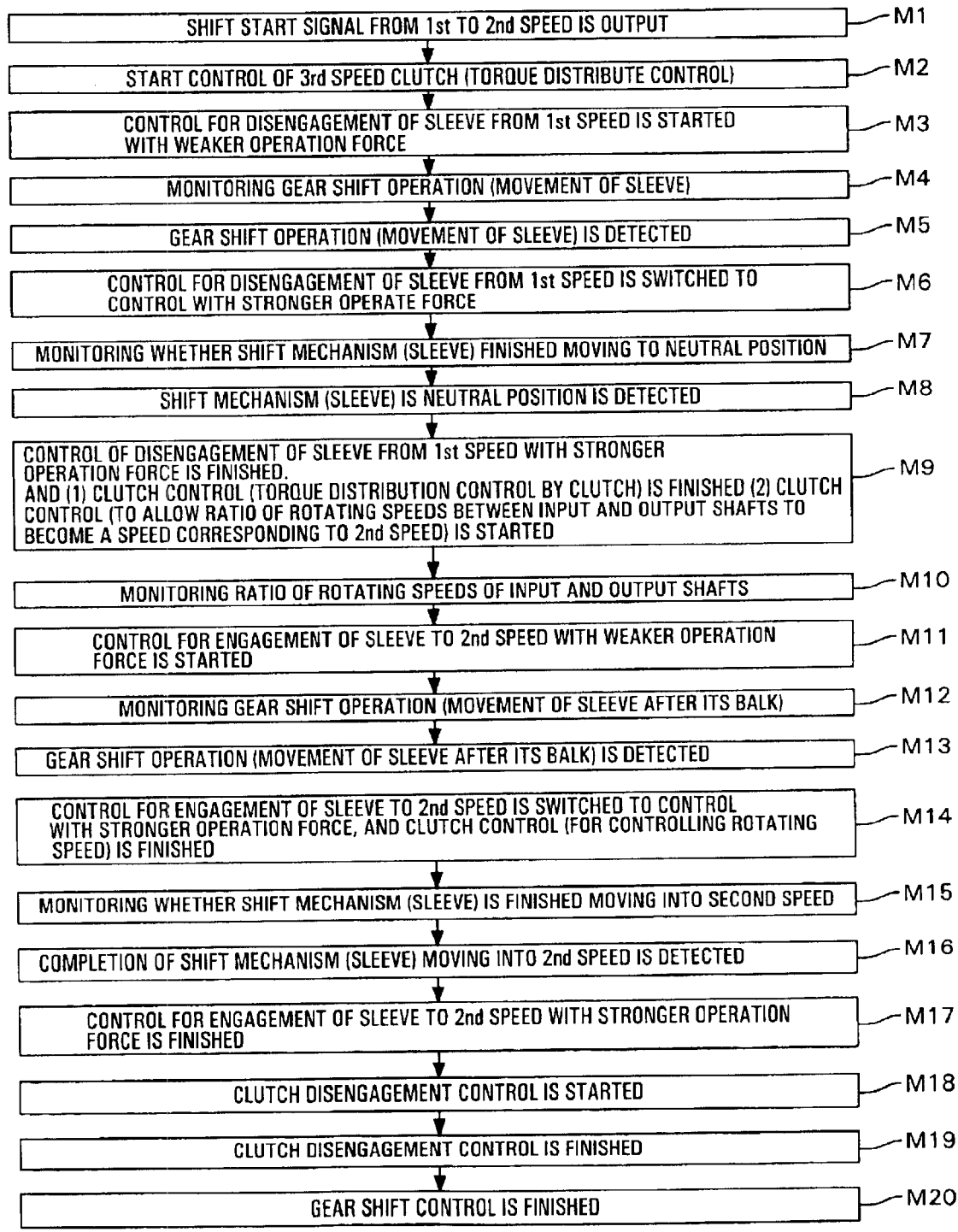
FIG. 1 is a flow chart showing a transmission shift control (first-speed to second-speed) according to the present invention.

Referring to FIG. 1, for example, if it is detected that a gear ratio is about to shift from the first-speed to the second speed, a shift start signal is output at step M1 to start the control of the third-speed clutch 48 (torque distribute control) at step M2.

A control for disengagement of the sleeve 52 from the first-speed is started with the weaker operational force at step M3, followed by monitoring of the gear shift operation (i.e., movement of the sleeve 52) at step M4 to detect the gear shift operation (movement of the sleeve 52) at step M5.

If the shift operation is detected, the control for disengagement of the sleeve 52 from the first-speed gear 32 is switched to the control with the stronger operational force at step M6. Then it is monitored whether the shift mechanism (sleeve 52) finishes moving to a neutral position at step M7, and the shift mechanism (sleeve 52) in the neutral position is detected at step M8.

When the shift mechanism 52 in the neutral position is detected, the control of disengagement of the sleeve 52 from the first-speed gear with the stronger operational force is finished. At this time, (1) clutch control (torque distribution control by the clutch 48) is finished and (2) clutch control (to allow the ratio of the rotating speeds between the input and output shafts to become to the speed corresponding to the second-speed) is started at step M9. The ratio of the rotating speeds of the input and output shafts is monitored at step M10.

A control for engagement of the sleeve 52 to the second-speed gear 34 with the weaker operational force is started at step M11, followed by monitoring the gear shift operation (movement of the sleeve 52 after its balk in the neutral position) at step M12 to detect the gear shift operation (movement of the sleeve 52 after its balk) at step M13.

If the gear shift operation is detected, the control for engagement of the sleeve 52 to the second-speed gear 34 is switched to the control with the stronger operational force, and the clutch 48 control (for controlling the rotating speed) is finished at step M14.

Also, it is monitored whether the shift mechanism (sleeve 52) is finished moving into the second speed position at step M15. If it is detected that the shift mechanism (sleeve 52) is finished moving into the second speed at step M16, the control for the engagement of the sleeve 52 to the second-speed with the stronger operation force is finished at step M17 while the clutch 48 disengagement control is started at step M18. When the clutch disengagement control is finished at step M19, the gear shift control is finished at step M20.

Here, transmission of actual acceleration torque is explained with reference to the drawings. Referring to FIG.

4, during operation in the first-speed gear train, the acceleration torque from the engine (not shown) is transmitted through the engine output shaft 4, the start clutch 6, and the input shaft 8 to the first-speed drive gear 20. The torque transmitted to the first-speed drive gear 20 is transmitted through the first-speed driven gear 32 in mesh therewith, the 1st synchronizer 56, and 1st/2nd sleeve 52 which is a part of the 1st synchronizer 56, to the countershaft 10. Further, the acceleration torque is transmitted from the countershaft 10 through the final drive and driven gears 30, 44, to the drive shaft 18 in the differential section 16.

Figure 5:
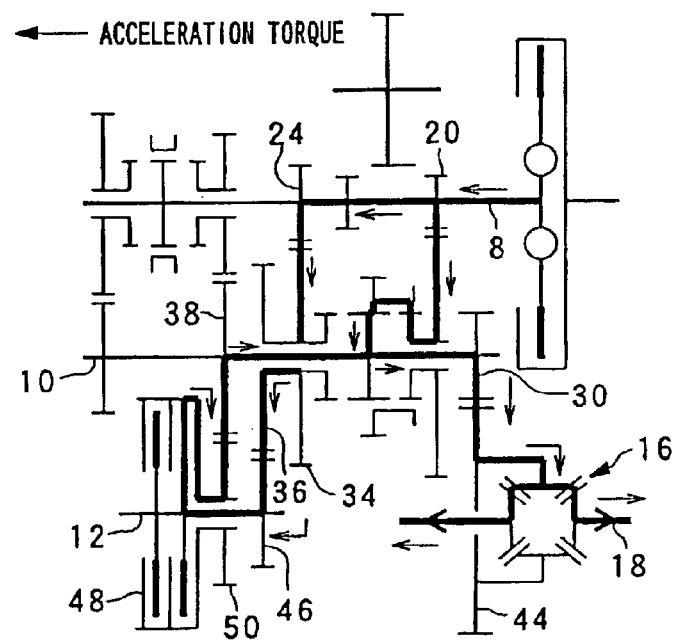
FIG. 5 is a schematic view of the transmission showing acceleration torque at the beginning of a third-speed clutch torque distribution.

Referring to FIG. 5, at the beginning of the torque distribution of the third-speed clutch 48, the acceleration torque is transmitted from the input shaft 8 to the drive shaft 18 in the differential section 16 as in the first-speed. In addition, the acceleration torque from the input shaft 8 is also transmitted from the second-speed drive gear 24 through the second-speed driven gear 34 in mesh therewith, the third-speed drive gear 36 fixed to the driven gear 34, and the third-speed driven gear 46 in mesh therewith, to the transmission shaft 12 of the clutch 48. The clutch 48 as a third-speed clutch then slidingly begins to transmit (share or distribute) the torque. While the torque transmitted to the first-speed drive gear 20 is reduced, the acceleration torque is applied to the countershaft 10 from the third-speed intermediate gear 50 fixed to the clutch 48 through the fourth-speed driven gear 38 in mesh with the third-speed intermediate gear 50. The acceleration torque is transmitted through the final drive and driven gears 44, 30 to the drive shaft 18 in the differential section 16 as in the first-speed.

Figure 6:
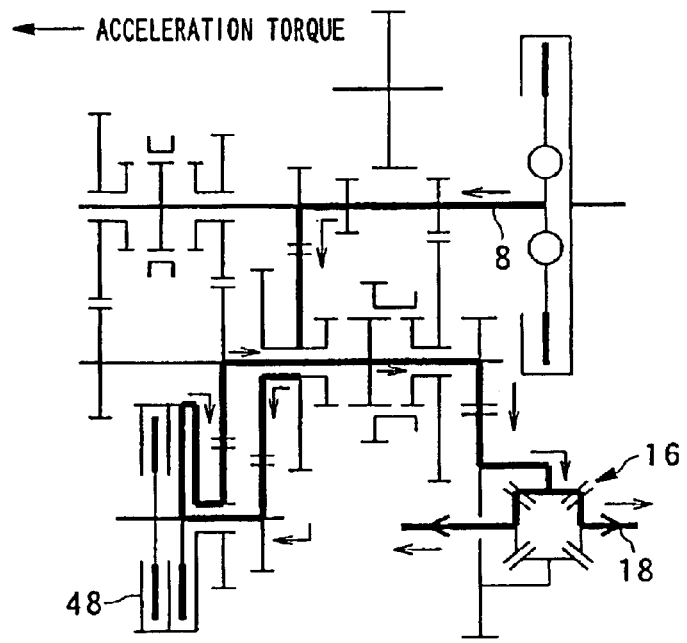
FIG. 6 is a schematic view of the transmission showing acceleration torque during the third-speed clutch torque distribution.

Referring to FIG. 6, while the torque is distributed to the third-speed clutch 48, the acceleration torque is transmitted in the same manner as using only the clutch 48 at the beginning of the torque distribution.

Figure 7:
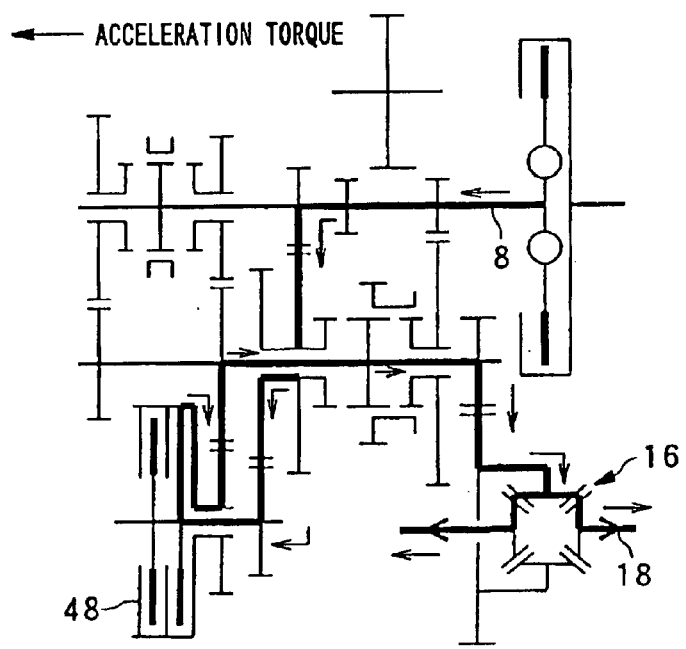
FIG. 7 is a schematic view of the transmission showing acceleration torque after synchronization with and shift to a second-speed gear.

Referring to FIG. 7, the acceleration torque, after the synchronization with and shift to the second-speed gear, is transmitted in the same manner as the third-speed clutch 48 distributing the torque.

Figure 8:
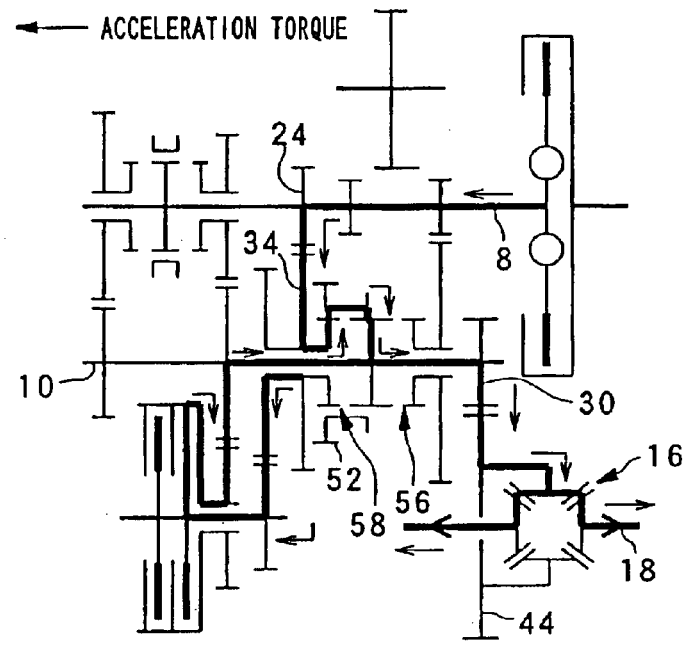
FIG. 8 is a schematic view of the transmission showing acceleration torque at the beginning of a disengagement of the third-speed clutch.

Now referring to FIG. 8, at the beginning of disengagement of the third-speed clutch 48, as in the case after synchronization with and shift to the second-speed, the acceleration torque is transmitted from the input shaft 8 to the drive shaft 18 of the differential section 16. Further the engagement of the second-speed synchronizer 58, which 1st/2nd sleeve 52 is as a part of the synchronizers 56, 58, permits the acceleration torque from the input shaft 8 to transmit through the second-speed drive and driven gears 24, 34, second-speed synchronizer 58, and the sleeve 52 to the countershaft 10. Then the torque is transmitted therefrom through the final drive and driven gears 30, 44 to the drive shaft 18 of the differential section 16.

Figure 9:
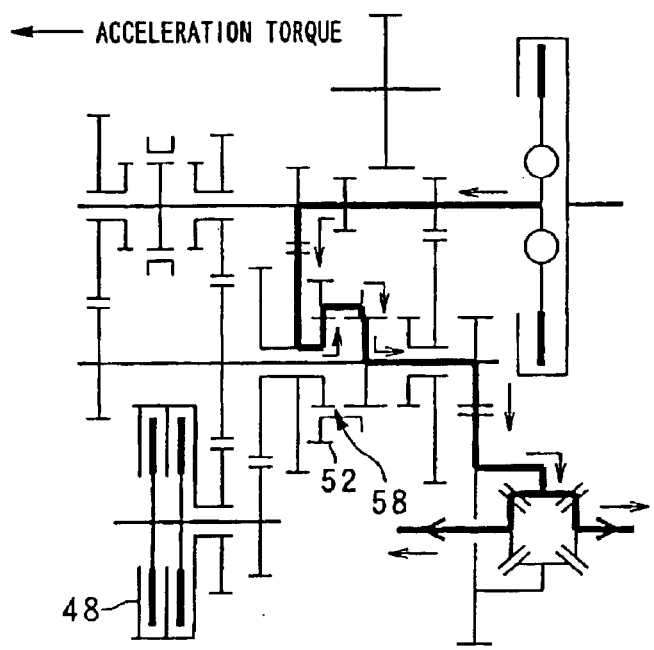
FIG. 9 is a schematic view of the transmission showing acceleration torque after the third-speed clutch is disengaged.

Further, referring to FIG. 9, after the clutch 48 as a third-speed clutch is disengaged, the acceleration torque is transmitted in the same manner as using only the synchronizer 58 and the sleeve 52 at the beginning of the disengagement of the third-speed clutch.

Figure 10:
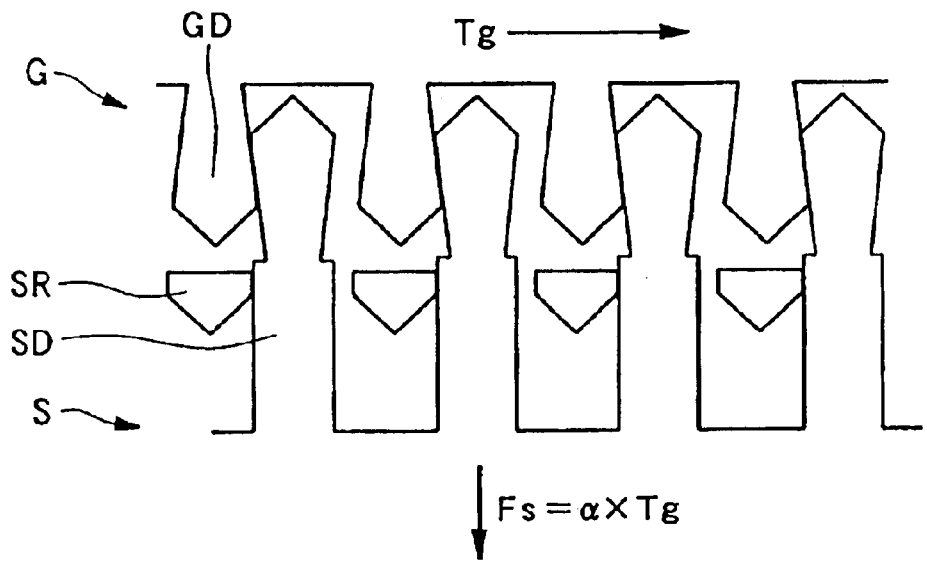
FIG. 10 is a schematic view showing engagement of the gear and shift sleeve when the shift sleeve is to be disengaged.

Referencing now FIG. 10, "Tg" is torque applied to the gear G, "Tc" is torque applied to the clutch, "Fshift" is shift operation force which moves the shift sleeve, and "Sshift" is shift stroke. During the gear shift operation (see FIG. 6), in a conventional operation for the disengagement of the shift sleeve, it is difficult to determine, from the rotating speed and the like, how much the torque is distributed, so that feed-forward control is executed with respect to the characteristic of the clutch 48.

Figure 11:
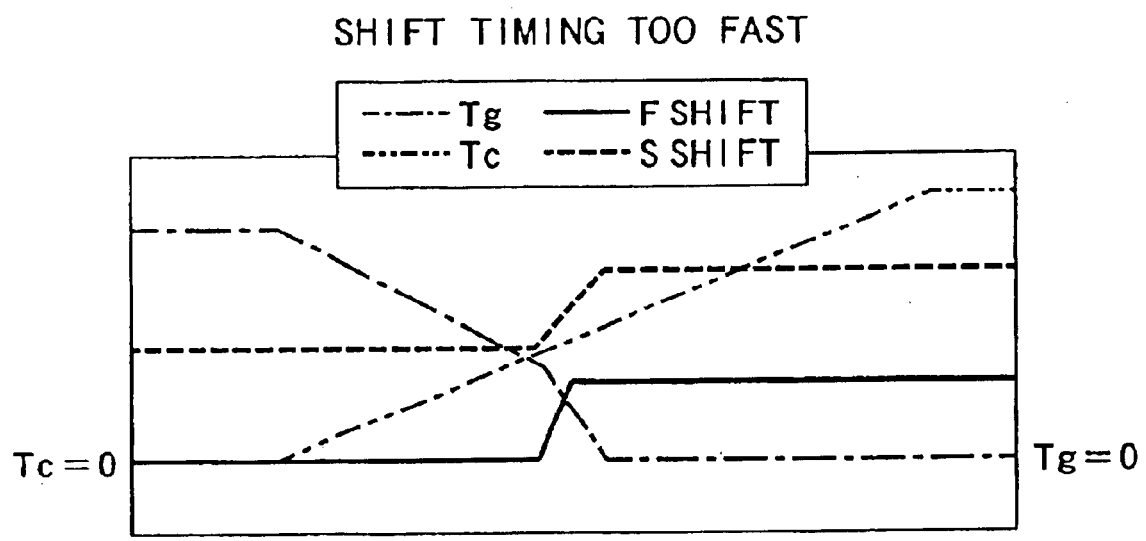
FIG. 11 is a timing chart of the shift sleeve disengagement showing shift timing is too fast.
Figure 12:
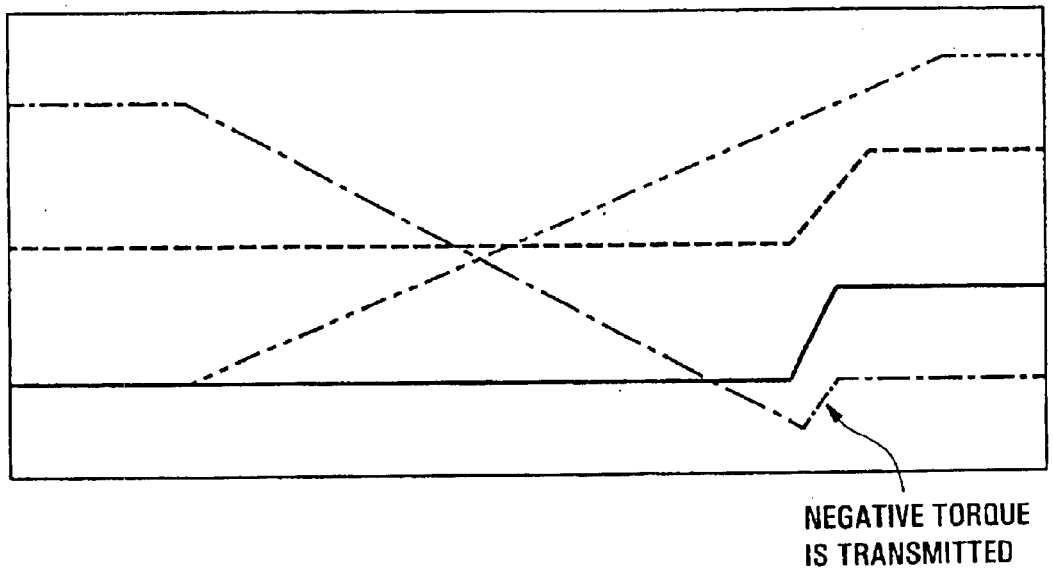
FIG. 12 is a timing chart of the shift sleeve disengagement showing shift timing is too slow.

When the characteristic of the clutch 48 is changed, the timing when the gear torque "Tg" is zero and the timing when the shift operation force "Fshift" is produced, do not correspond so that shock occurs when the sleeve is disengaged (see FIGS. 11 and 12).

It is therefore required that gear torque "Tg" is determined during control to meet the changes in characteristic of the clutch 48.

In addition, "Fs", that is minimum force needed to disengage the shift sleeve, is a resultant of the opposite-tapered shape (gradually thicker) of the gear dog GD and friction, and is proportional to the gear torque "Tg".

Figure 13:
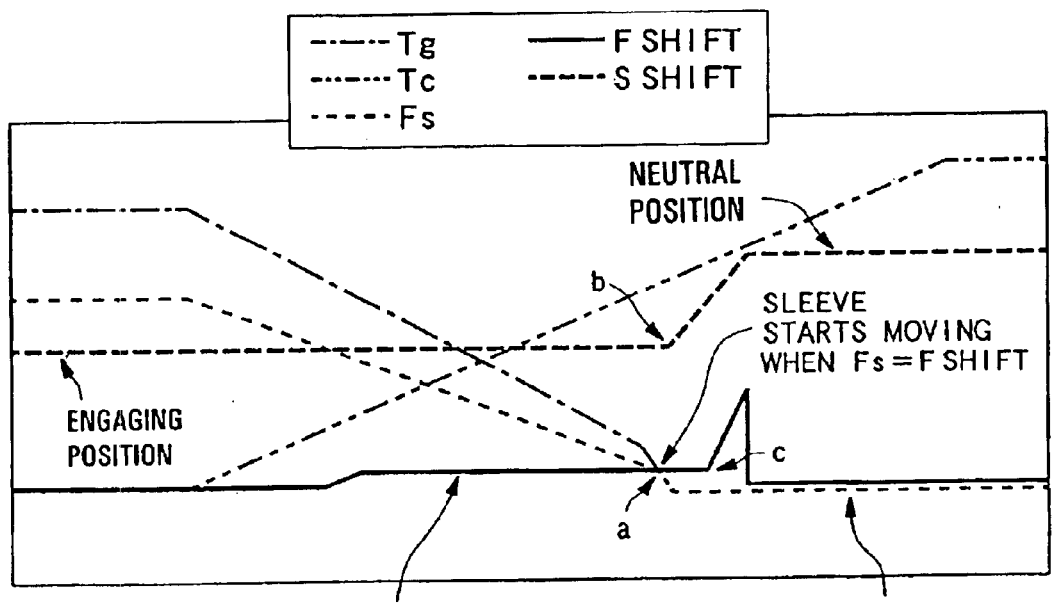
FIG. 13 is a timing chart of the shift sleeve disengagement when the low load shift operation force is applied.

Accordingly, as shown in FIG. 13, the present invention utilizes this proportion to detect the gear torque "Tg" to prevent the gear shock when the shift sleeve is disengaged.

FIG. 13 shows a timing chart when the low load shift force is applied as the shift sleeve is about to disengage. "Fshift" is the shift operation force which corresponds to "Fs" (minimum required force to disengage the sleeve) dependant of "Tg" which does not give shock. When "Fs" is less than or equal to "Fshift" (Fs<=Fshift) (see symbol "a" in FIG. 13), a shift stroke "Sshift" begins to work (see "b") to operate with the stronger operational force "Fshift" (see "c") switched from the weaker operational force. These operations are explained chronologically, although they occur substantially simultaneously.

Simultaneously with or after the clutch torque "Tc" is generated, the "Fshift" is produced. When "Fs" is less than "Fshift" (Fs<Fshift), the initial movement associated with the shift stroke "Sshift" is detected and the shift force "Fshift" is increased to disengage the sleeve from the gear. Thereby, the disengagement of the shift mechanism is achieved independently of the clutch characteristic.

Shown in FIG. 10 is the engagement of the dogs "GD" and "SD" of the gear "G" and the sleeve "S" when the sleeve is to be disengaged. Reference numeral "SR" designates a synchronizer ring.

With regards to the second-speed engagement shown in FIG. 7, the second-speed synchronization is achieved by balance of the engine torque and the third-speed clutch torque, although it can be difficult to synchronize the rotating speeds thereof.

Figure 14:
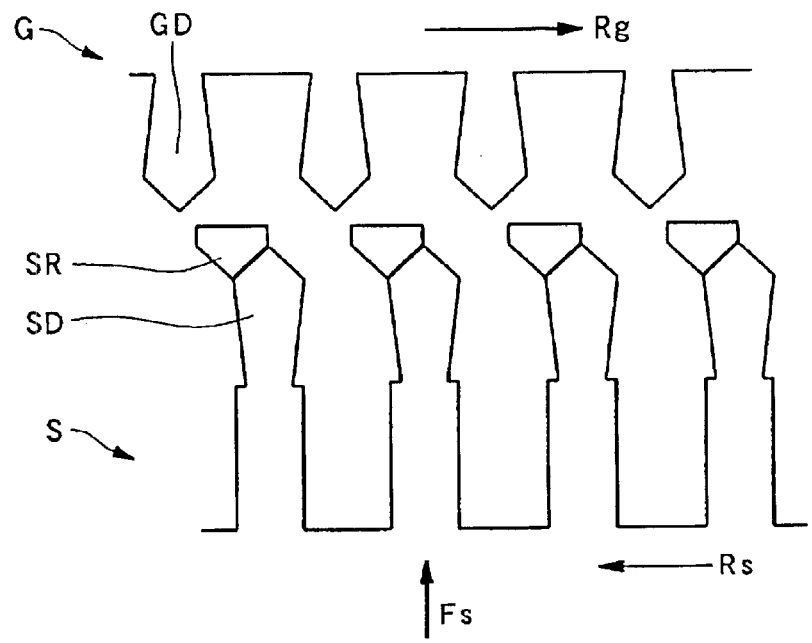
FIG. 14 is a schematic view showing engagement of the gear and the shift sleeve before engagement with the second-speed gear.
Figure 15:
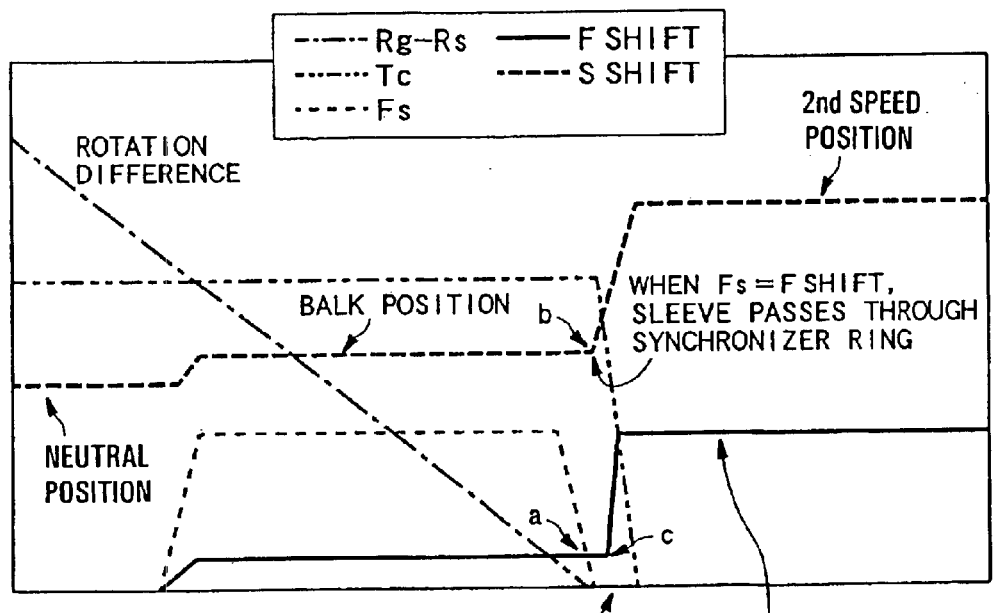
FIG. 15 is a timing chart of the shifting to the second-speed gear when the low load shift operation force is applied.

FIG. 14 shows engagement of the dogs "GD" and "SD" of the respective gear "G" and sleeve "S" before engagement with the second-speed gear. FIG. 15 shows a timing chart shift to the second-speed. When the synchronization is not finished, that is when Rg–Rs≠0 (wherein "Rg" is rotating speed of the gear, and "Rs" is rotating speed of the sleeve), "Fs" which is a force required to engage the sleeve "S" with the gear dog "GD", is always greater than the shift operation force "Fshift" by the synchronizing function. When the synchronization is finished (Rg–Rs=0), then "Fs" equals zero (Fs=0). When the shift stroke "Sshift" is detected, "Fshift" is increased for shift engagement, and the clutch is disengaged after the shift is achieved. Thereby, shift operation is achieved without gear shock or grinding noise as accompanied by poor synchronization.

FIG. 15 shows a timing chart of the shifting of the shift sleeve from the disengaged or neutral position of FIG. 13 into, the second-speed condition with the low load shift force. The shifting of the sleeve to the second-speed with the weaker shift operational force is started and the engagement operation (the movement of the shift sleeve after balk) is monitored and is detected. When movement of the shift stroke "Sshift" is detected (see "b" in FIG. 15), "Fshift" is switched to the stronger operating force (see "c") to effect engagement of the shift sleeve with the second speed gear. The shift operating force "Fshift" can be re-set to zero when the sleeve is engaged in the second-speed position. Alternatively, the "Fshift" can be maintained for a predetermined time as shown in FIG. 15 to ensure the engagement. It is noted that the sleeve passes through a synchronizer ring when FS equals to Fshift at symbol "b" in FIG. 15.

Thereby, the controller 64 controls the operational force of the shift mechanism to have stronger and weaker shifting forces or stages, e.g., two stages, and includes a sensor to detect movements of components in the 2nd shift mechanism 58. The shift mechanism 58 starts the gear shift operation with the weaker operation force during gear shift, and is changed to the stronger operation force after the shift operation of the shift mechanism 58 is detected. Accordingly, the state of the torque of the gear being shifted to, so that the gear shift is easily achieved without shift shock or grinding resulting from the poor synchronization.

In addition, it is difficult to determine the gear torque on the control and an additional sensor is required since a single normal rotational sensor used for shift control cannot estimate the gear torque. However according to one embodiment of the present invention, the additional special sensor is not needed, which reduces costs and is economically advantageous.

Further, the weaker operation force is of a magnitude in which a dog GD of the gear G and the 1st/2nd sleeve 52 as a sleeve of the 2nd synchronizer 58 are able to disconnect in a lower torque transmitted state, but are unable to disconnect in a higher torque transmitted state. Accordingly, the state of the torque to the selected gear being shifted is detected with reliability, which achieves shifting operation without shocks by the simple control.

Still further, the shift operation of the 2nd synchronizer 58, which is a condition to change to the stronger operational force, is executed according to the movement of the synchronizer after its balk. Accordingly, completion of the synchronization is detected with reliability to achieve shift operation without gear shocks.

In the synchronization control using the clutch in which the transmitted torque is able to be variably controlled, after synchronization of the ratio of rotating speeds of the input shaft 8 and the output shaft or countershaft 10 with the ratio of the gear being selected, followed by output of the shift operation signal to begin shift operation, then the actual shift operation is delayed to lost synchronization. By this delayed synchronization, the second-speed synchronizer 58 is given large burden and is worn so as to reduce durability. To obviate the above inconvenience, the synchronization is ensured to be maintained but the control system becomes complicated. Shifting time becomes longer because the shift operation is executed after the synchronization is established. On the contrary, according to an embodiment of the present invention, the 2nd synchronizer 58 is operated with the weaker operational force which does not impose a load burden thereon, so that the synchronization is executed easily. The shift time is reduced since the 2nd synchronizer 58 is balked before its synchronization.

Furthermore, the sensors are equipped to detect the rotating speeds of the input and output shafts 8 and 10. The gear shift of the 2nd synchronizer 58 or the shift mechanism is started with the weaker operational force during shift change. The ratio between the rotating speeds of the input and output shafts 8, 10 is controlled by the clutch to variably control the torque transmitted, e.g. the clutch 48. When the ratio between the rotating speeds of the input and output shafts 8, 10 is close to the ratio of speed of the gear being selected, the gear shift of the 2nd synchronizer 58 is executed with the stronger operational force. Accordingly, the 2nd synchronizer 58 is operated with the weaker operational force which does not impose a load burden thereon, so that the synchronization is executed easily. The shift time is reduced since the 2nd synchronizer 58 is balked before its synchronization. Also, the switching between the weaker and stronger operational forces is determined from only the rotating speeds, using the existing sensor for control.

The present invention is not limited to the above-mentioned embodiment(s), but is adaptable for various applications and variations or modifications.

For example, in one embodiment of the present invention, the operation force of the second-speed synchronizer 58 as a shift mechanism is configured to have two stages. As a special configuration, the stages can include three or more stages.

Also, when the operation force of the second-speed synchronizer 58 as a shift mechanism is divided into the two stages, the weaker operation force is maintained uniform. As a special configuration, the weaker operation force can be varied according to signals of a driving state of the vehicle or other factors. The weaker operation force thus can be varied according to changes in the actual driving state or the other factor, thereby increasing the reliability of the control without shift shock or the grinding of gears resulting from poor synchronization.

As amplified in the above description, the present invention provides a shift control method for an automatic transmission. More particularly, the shift control method includes an input shaft 8 to which driving force by an engine is input, an output shaft 10 in parallel with the input shaft 8 and to output the shifted driving force of the engine toward drive wheels, a start clutch 6 to connect or disconnect between the engine and the input shaft 8, a plurality of gear trains disposed between the input and output shafts 8, 10 so as to provide plural gear ratios, a shift mechanism to shift each gear train, a clutch 48 on a drive force transmitting path between the input and output shafts 8, 10 to variably control the transmitted torque, the clutch 48 being configured to transmit the torque during gear shift, and an actuator to shift the gear trains. In the above constitution of the present invention, the operational force of the shift mechanism has at least two stages, including stronger and weaker shift forces or stages. A sensor is provided to detect the movement of components of the shift mechanism. Shift operation of the shift mechanism is started with the weaker operational force, and is switched to the stronger operational force when the movement of the shift mechanism is detected. Accordingly, the state of the torque during shift to the selected gear is detected with reliability, which achieves shifting operation without shocks by the simple control. In addition, it is very difficult to determine the gear torque on the control and an additional sensor is typically required since a single normal rotational sensor used for shift control cannot estimate the gear torque. However according to one embodiment of the present invention, the additional special sensor is not needed, which reduces costs and is advantageous from an economical viewpoint.

In addition, the invention also provides a shift control method for an automatic transmission including an input shaft 8 to which driving force by an engine is input, an output shaft 10 in parallel with the input shaft 8 and to output the shifted driving force of the engine toward drive wheels, a start clutch 6 to connect or disconnect between the engine and the input shaft 8, a plurality of gear trains disposed between the input and output shafts 8, 10 so as to provide each gear ratio, a shift mechanism to shift each gear train, a clutch 48 on a drive force transmitting path between the input and output shafts 8, 10 to variably control the transmitted torque, the clutch 48 being configured to transmit the torque during gear shift, and an actuator to shift the gear trains. In the above constitution of the present invention, the operational force of the shift mechanism has at least two stages, including stronger and weaker stages. A sensor to detect rotating speed of the input shaft and a sensor to detect rotating speed of the output shaft are provided. Shift operation of the shift mechanism is started with the weaker operational force. Ratio of rotating speeds of input and output shafts is controlled by the clutch 48 variably controlling the transmitted torque. Shift operation of the shift mechanism is switched to the stronger operational force when the ratio of rotating speeds of input and output shafts is close to the rotating speed of the gear being selected. Accordingly, the shift mechanism is operated with the weaker operational force which imposes less load to the mechanism, while achieving easier synchronizing control. The shift time is reduced since the 2nd synchronizer 58 is balked before its synchronization. Also, the switching between the weaker and stronger operational force is determined from the rotating speeds controlled by the existing sensor.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A shift control method for an automatic transmission having an input shaft to which driving force by an engine is input, an output shaft in parallel with said input shaft for outputting the shifted driving force of said engine to drive wheels, a start clutch to connect or disconnect between said engine and said input shaft, a plurality of gear trains disposed between said input and output shafts so as to provide plural ratios, a shift mechanism including a synchronizer for shifting the gear train, and a secondary clutch on a drive force transmitting path between said input and output shafts to variably control the transmitted torque, said secondary clutch being configured to transmit the torque during gear shift, and an actuator to shift said gear trains, comprising the steps of:

providing an operational force for said shift mechanism having at least two stages, including stronger and weaker stages;

providing a sensor to detect rotating speed of said input shaft and providing a sensor to detect rotating speed of said output shaft;

providing a shift operation of said shift mechanism that is started with the weaker operational force;

controlling the ratio of rotating speeds of said input and output shafts by variably controlling the torque transmitted by said secondary clutch; and switching the shift operational force of said shift mechanism to said stronger operational force after balk when the ratio of rotating speeds of said input and output shafts is close to the rotating speed of the gear being shifted to.

2. A shift control method for an automatic transmission having an input shaft for receiving driving force from an engine, an output shaft in parallel with said input shaft for receiving the driving force from the input shaft to drive vehicle wheels, a start clutch to connect or disconnect between said engine and said input shaft, a plurality of gear trains disposed between said input and output shafts so as to provide plural gear ratios, a shift mechanism including a synchronizer and a sleeve, a secondary clutch connected on a drive transmitting path between said input and output shafts configured to transmit and variably control the transmitted torque during gear shift, and a shift actuator to shift between the gear trains, said method comprising the steps of:

providing the shift mechanism with an operational force having at least two stages, including a stage having a strong operational force and a stage having a weak operational force;

providing a sensor to detect movement of the sleeve of the shift mechanism;

detecting if a gear ratio is about to shift from a first gear to a second gear to output a shift signal;

outputting a shift start signal to begin control of the secondary clutch;

beginning controlling disengagement of the sleeve with the weak operational force for the shift mechanism;

monitoring gear shift operation by sensing movement of the sleeve to detect gear shift operation;

after detecting gear shift operation, controlling disengagement of the sleeve by changing the operational force of the shift mechanism to the strong operational force;

monitoring if the shift mechanism is in a neutral disengaged position;

when the neutral disengaged position is detected, operating the secondary clutch to control the ratio of speeds between the input and output shafts;

monitoring the ratio of rotating speeds of the input and output shafts;

controlling engagement of the sleeve to the second gear with the weak operational force;

monitoring gear shift operation by movement of the sleeve after balk of the synchronizer;

after the gear shift operation is detected, controlling engagement of the sleeve to the gear with the secondary clutch at the strong operational force;

monitoring if the sleeve of the shift mechanism is finished moving into the second gear; and after the shift mechanism is finished moving into the second gear, disengaging the secondary clutch, whereby the gear shift is completed.

3. The shift control method for an automatic transmission according to claim 1, wherein a dog of a gear and the sleeve are able to disconnect at a low torque value but are unable to disconnect at a high torque value.

* * * * *